US012013112B1

(12) United States Patent
Jia et al.

(10) Patent No.: US 12,013,112 B1
(45) Date of Patent: Jun. 18, 2024

(54) AIR PURIFIER WITH AMBIENT LAMP

(71) Applicant: Shenzhen Airtok Technology Co., Ltd, Guangdong (CN)

(72) Inventors: Yuewen Jia, Guangdong (CN); Xiaosong Liu, Guangdong (CN); Qisheng Ke, Guangdong (CN); Jiang Wang, Guangdong (CN)

(73) Assignee: Shenzhen Airtok Technology Co., Ltd, Shenzhen (CN)

(*) Notice: Subject to any disclaimer, the term of this patent is extended or adjusted under 35 U.S.C. 154(b) by 0 days.

(21) Appl. No.: 18/221,386

(22) Filed: Jul. 12, 2023

(30) Foreign Application Priority Data

Jun. 1, 2023 (CN) ........................ 202321380269.8

(51) Int. Cl.
*F21V 33/00* (2006.01)
*F21S 4/10* (2016.01)
*H05B 47/105* (2020.01)
*F24F 8/10* (2021.01)

(52) U.S. Cl.
CPC ............ *F21V 33/0044* (2013.01); *F21S 4/10* (2016.01); *H05B 47/105* (2020.01); *F24F 8/10* (2021.01); *F24F 2221/02* (2013.01)

(58) Field of Classification Search
CPC ................................ F24F 8/10; F24F 2221/02
See application file for complete search history.

(56) References Cited

U.S. PATENT DOCUMENTS

| | | | | |
|---|---|---|---|---|
| 8,876,331 | B2 * | 11/2014 | Waring | B60Q 1/2696 362/240 |
| 2007/0238404 | A1 * | 10/2007 | Park | B08B 15/04 55/385.2 |
| 2017/0216754 | A1 * | 8/2017 | Ingham | B60Q 1/2661 |
| 2017/0351221 | A1 * | 12/2017 | Balti | G01N 33/0037 |
| 2020/0278123 | A1 * | 9/2020 | Kumra | F24F 6/16 |
| 2021/0190308 | A1 * | 6/2021 | Marinus | F21V 33/0096 |
| 2024/0034228 | A1 * | 2/2024 | Yoshizumi | B60H 3/0608 |

FOREIGN PATENT DOCUMENTS

CN 218119556 U * 12/2022

OTHER PUBLICATIONS

English translation of Lin CN-218119556-U, published Dec. 2022 (Year: 2022).*

* cited by examiner

*Primary Examiner* — Evan P Dzierzynski

(57) ABSTRACT

Disclosed is an air purifier with an ambient lamp. The air purifier includes an upper housing, a lamp belt, and a lower housing, where a bottom edge of the upper housing is provided with a fixing recess matching the lamp belt in shape, the lower housing includes a base and a supporting plate vertically arranged at a preset position of the base, and the base is fixedly connected to a bottom of the upper housing, such that one end of the supporting plate away from the base presses the lamp belt in the fixing recess, and the lamp belt is arranged opposite an edge of the base at an interval. According to the present invention, the lamp belt is fixed to the bottom of the upper housing, and the lamp belt and the base of the lower housing are arranged at an interval.

9 Claims, 6 Drawing Sheets

AIR PURIFIER WITH AMBIENT LAMP

CROSS REFERENCE TO RELATED APPLICATIONS

The present application claims the benefit of Chinese Patent Application No. 202321380269.8 filed on Jun. 1, 2023, the contents of which are incorporated herein by reference in their entirety.

TECHNICAL FIELD

The present invention relates to the technical field of air purifiers, and particularly relates to an air purifier with an ambient lamp.

BACKGROUND

As people's living standards have improved, quality of life and working environments attract more attention from people. As a fashionable small household appliance, an air purifier can bring fresh air to a home environment, so it grows popular increasingly. At present, some air purifiers can be further equipped with lighting lamps or ambient lamps. They can play a certain role in lighting, enhancing atmosphere and displaying air quality. However, a light source of an existing ambient lamp is generally directly mounted on a surface of a purifier. In this way, direct light emission of the light source can produce adverse effects such as glare. Further, the ambient lamp can be easily damaged due to hitting, water ingress, and the like.

In view of this, it is really necessary to provide an air purifier with an ambient lamp so as to overcome the above defects.

SUMMARY

An objective of the present invention is to provide an air purifier with an ambient lamp, so as to solve the problems that the ambient lamp of the air purifier is glaring and easy to damage. The ambient lamp is shielded to a certain extent, such that a visual effect is improved, and problems that water enters the ambient lamp and the ambient lamp is hit and damaged are avoided.

In order to achieve the above objective, the present invention provides an air purifier with an ambient lamp. The air purifier includes an upper housing, a lamp belt, and a lower housing, where a bottom edge of the upper housing is provided with a fixing recess matching the lamp belt in shape, the lower housing includes a base and a supporting plate vertically arranged at a preset position of the base, and the base is fixedly connected to a bottom of the upper housing, such that one end of the supporting plate away from the base presses the lamp belt in the fixing recess, and the lamp belt is arranged opposite an edge of the base at an interval.

In a preferred embodiment, the lamp belt is an annular lamp belt, the fixing recess is an annular recess, and the supporting plate is an annular plate; the supporting plate divides the base into a first annular belt located at an outer side and a second annular belt located at an inner side; a middle portion of the second annular belt is provided with a through hole; and a vertical projection of the lamp belt relative to the base completely falls into the first annular belt.

In a preferred embodiment, the lamp belt includes an annular bottom wall, a first side wall vertically extending from an inner edge of the bottom wall, and a second side wall vertically extending from an outer edge of the bottom wall; and a plurality of lamp beads are distributed on the bottom wall, and the first side wall and the second side wall are clamped in the fixing recess in an interference manner.

In a preferred embodiment, one end of the first side wall away from the bottom wall extends inward to form a limiting flange, and the supporting plate presses the limiting flange on a bottom of the fixing recess.

In a preferred embodiment, the bottom wall is a transparent plate, and the plurality of lamp beads are evenly arranged between the first side wall and the second side wall.

In a preferred embodiment, a reflective layer is further attached to one side of the first annular belt close to the upper housing.

In a preferred embodiment, a preset position of a top of the second side wall extends in a direction away from the first side wall so as to form a plurality of clamping blocks, a bottom of a side wall of the fixing recess is provided with a plurality of clamping recesses corresponding to the clamping blocks one by one, and the clamping blocks are configured to match the clamping recesses so as to clamp the second side wall in the fixing recess.

In a preferred embodiment, the lower housing further includes a cover plate, the cover plate is fixed to one side of the base away from the upper housing, and the cover plate has a greater area than the through hole; and the cover plate is fixedly connected to the second annular belt, so as to close the through hole.

In a preferred embodiment, the bottom of the upper housing is provided with a plurality of fixing columns, and the fixing columns are provided with threaded grooves; the second annular belt is provided with a plurality of first threaded holes corresponding to the fixing columns one by one in a penetrating manner; the cover plate is provided with a plurality of second threaded holes corresponding to the first threaded holes one by one in a penetrating manner; and the second threaded hole is connected to the corresponding first threaded hole and the corresponding threaded groove by means of the same bolt, such that the cover plate is fastened to the second annular belt, and the lower housing is fixed to the bottom of the upper housing.

In a preferred embodiment, the upper housing is internally provided with a detection sensor and a control module, and the lamp belt is a multi-colored lamp; and the detection sensor is configured to detect air quality, and the control module is configured to control the lamp belt to emit light having different colors and/or different brightness according to the air quality detected by the detection sensor.

In the air purifier with an ambient lamp according to the present invention, the bottom of the upper housing is provided with a fixing recess, and further the supporting plate of the lower housing presses the lamp belt in the fixing recess, such that the lamp belt is fixed to the bottom of the upper housing, and the lamp belt and the base of the lower housing are arranged at an interval; and the lamp belt is shielded to a certain extent, such that the lamp belt may emit light softly via a gap between the lamp belt and the base, and influence on a visual effect due to glare of the light source can be avoided. Meanwhile, the lamp belt is arranged below the upper housing and protected by the base to a certain extent, such that water cannot easily enter the lamp belt, a probability that the lamp belt is hit is greatly reduced, and the service life of the ambient lamp is prolonged.

BRIEF DESCRIPTION OF THE DRAWINGS

In order to more clearly describe technical solutions of examples of the present invention, the accompanying drawings required in the examples will be described briefly below. It should be understood that the following accompanying drawings illustrate only some examples of the present invention and therefore should not be construed as a limitation on the scope. For those of ordinary skill in the art, other relevant accompanying drawings can also be obtained from these accompanying drawings without any creative effort.

Figure 1:
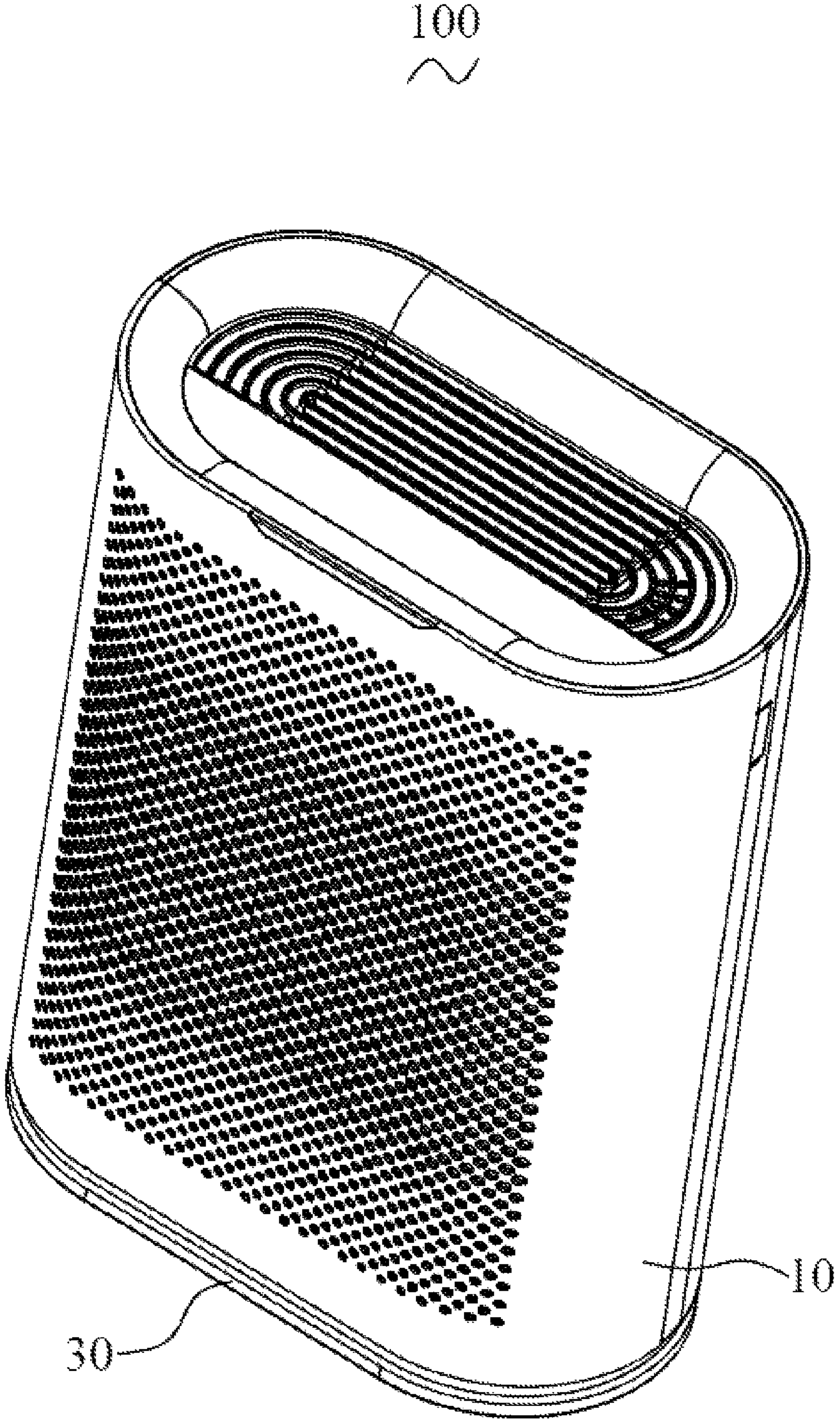
FIG. 1 is a solid diagram of an air purifier with an ambient lamp according to the present invention.
Figure 2:
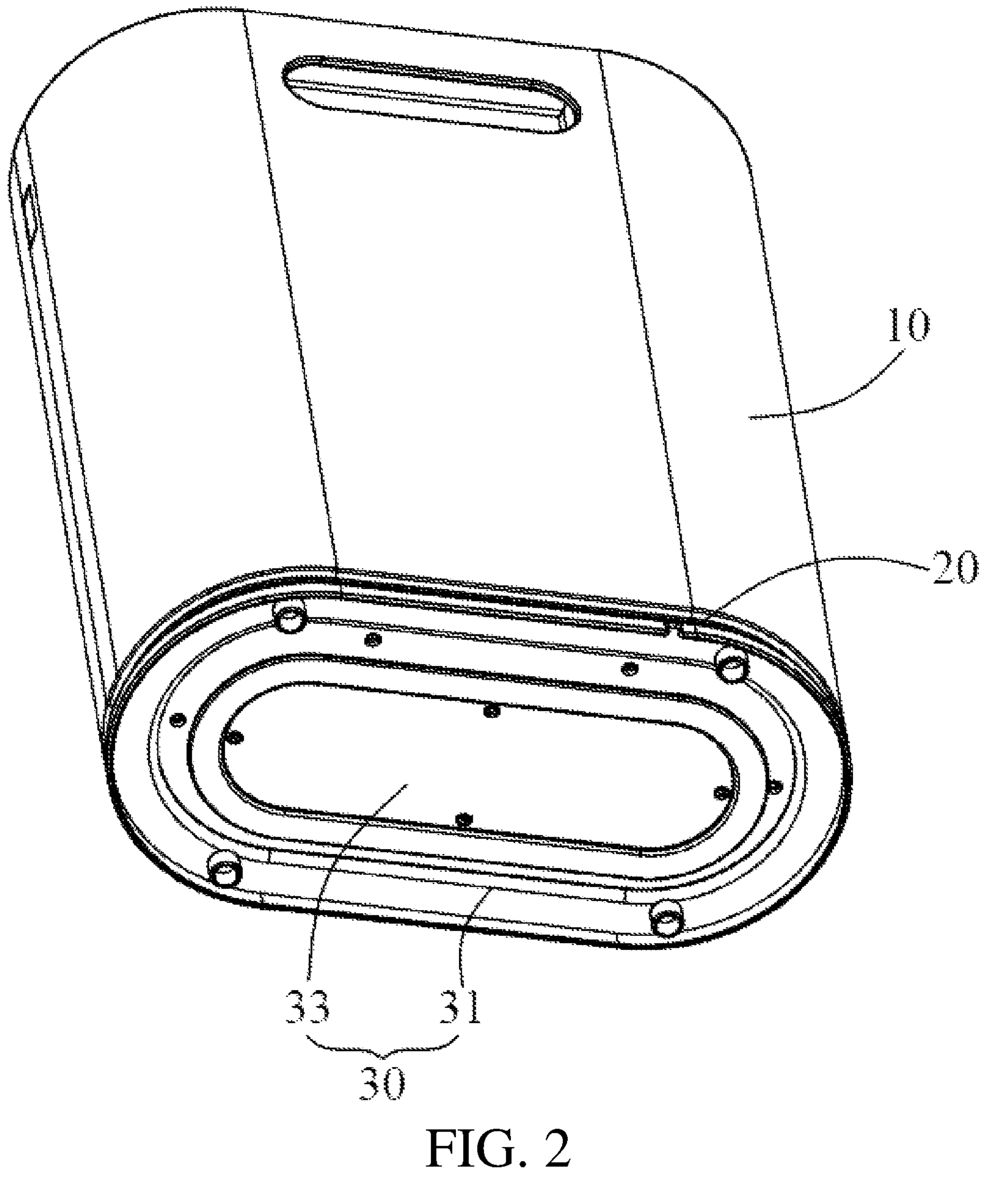
FIG. 2 is a solid diagram of another visual angle of the air purifier with an ambient lamp as shown in FIG. 1.

Reference numerals in the figures: 100, air purifier with an ambient lamp; 10, upper housing; 11, fixing recess; 111, clamping recess; 12, fixing column; 121, threaded groove; 20, lamp belt; 21, bottom wall; 22, first side wall; 221, limiting flange; 23, second side wall; 231, clamping block; 30, lower housing; 31, base; 311, first annular belt; 312, second annular belt; 3121, first threaded hole; 313, through hole; 32, supporting plate; 33, cover plate; 331, second threaded hole.

DETAILED DESCRIPTION OF THE EMBODIMENTS

For making objectives, technical solutions and beneficial technical effects of the present invention clearer, the present invention will be described in further detail below in conjunction with the accompanying drawings and specific embodiments. It should be understood that the specific embodiments described herein are merely illustrative of the present invention and are not intended to limit the present invention.

It should be further understood that the terms used in the description of the present invention are merely for the purpose of describing specific examples and are not intended to limit the present invention. As used in the description and the appended claims of the present invention, the singular forms “a”, “an”, and “the” are intended to include plural forms as well, unless otherwise explicitly indicted in the context.

It should be further understood that the term “and/or” used in the description and the appended claims of the present invention refers to any combination and all possible combinations of one or more of the associated listed items, and includes these combinations.

An example of the present invention provides an air purifier 100 with an ambient lamp. The air purifier is configured to purify indoor air, improve indoor air quality, and provide the ambient lamp and a lighting effect, and further may change brightness and color of the ambient lamp according to changes of air quality, so as to improve a display effect.

As shown in FIGS. 1-5, the air purifier 100 with an ambient lamp includes an upper housing 10, a lamp belt 20, and a lower housing 30. Herein, the upper housing 10 is a main structure of the air purifier, which includes a fan, an aromatherapy box, a negative ion generator, a circuit board and other structures, so as to achieve an air purification function. In the example, cross sections of both the upper housing 10 and the lower housing 30 are in a long strip shape having two semicircular ends.

A bottom edge of the upper housing 10 is provided with a fixing recess 11 matching the lamp belt 20 in shape. The fixing recess 11 is arranged along an edge directly under the upper housing 10, so as to form a non-circular annular structure, a shape of which is consistent with that of the cross section of the upper housing 10. The lamp belt 20 is fixed in the fixing recess 11, such that light of the lamp belt 20 is emitted in a direction away from the upper housing 10. For instance, when the upper housing 10 is vertically placed, the light emitted from the lamp belt 20 is directed towards the lower housing 30 and the ground. Therefore, an opening of the fixing recess 11 is set downward, and when the lamp belt 20 is mounted in the fixing recess 11, water drops from outside or along a surface of the upper housing 10 can hardly enter the fixing recess 11, such that a risk of short circuit of the lamp belt 20 caused by the fact that water enters the fixing recess 11 is effectively avoided.

The lower housing 30 includes a base 31 and a supporting plate 32 vertically arranged at a preset position of the base 31. The base 31 is fixedly connected to a bottom of the upper housing 10, for instance, by means of a bolt, such that one end of the supporting plate 32 away from the base 31 presses the lamp belt 20 in the fixing recess 11, and the lamp belt 20 is arranged opposite an edge of the base 31 at an interval. That is, one end of the supporting plate 32 is fixed to the base 31, and the other end of the supporting plate abuts against the upper housing 10, such that an annular interval region is formed between the upper housing 10 and the lower housing 30, and light emitted from the lamp belt 20 is emitted outward via the interval region. Therefore, an effect of protecting the lamp belt 20 is improved, and a risk that the lamp belt 20 is hit or water enters the lamp belt is effectively reduced.

Figure 6:
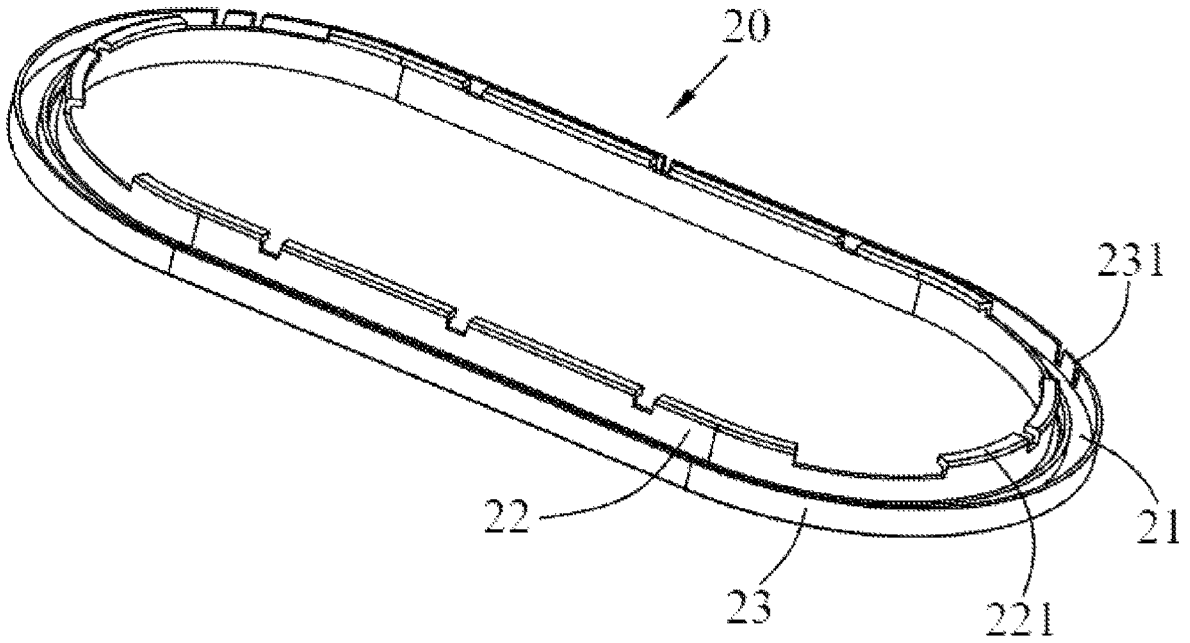
FIG. 6 is a solid diagram of a lamp belt of the air purifier with an ambient lamp as shown in FIG. 1.

Specifically, as shown in FIG. 6, the lamp belt 20 is an annular lamp belt, the fixing recess 11 is an annular recess, and the supporting plate 32 is an annular plate. The supporting plate 32 divides the base 31 into a first annular belt 311 located at an outer side and a second annular belt 312 located at an inner side. A middle portion of the second annular belt 312 is provided with a through hole 313. That is, the first annular belt 311 and the second annular belt 312 are coaxially and integrally arranged. It may be understood that the through hole 313 is defined by an inner wall of the second annular belt 312.

In the example, a vertical projection of the lamp belt 20 relative to the base 31 completely falls into the first annular belt 311. That is, the light emitted from the lamp belt 20 directly enters the first annular belt 311, and then is reflected by a surface of the first annular belt 311, so as to achieve an ambient lamp effect. In this way, the lamp belt 20 is shielded to a certain extent, a light source of the lamp belt 20 is prevented from emitting light directly to human eyes, and further a visual effect is improved. Further, a reflective layer (not shown in the figure) is further attached to one side of the first annular belt 311 close to the upper housing 10. The reflective layer may be a reflective material coating that coats the surface of the first annular belt 311, or a reflective film, so as to improve a light reflection effect of the first annular belt 311. Herein, the reflective layer is preferably a diffuse reflective layer.

In an example, as shown in FIG. 6, the lamp belt 20 includes an annular bottom wall 21, a first side wall 22 vertically extending from an inner edge of the bottom wall 21, and a second side wall 23 vertically extending from an outer edge of the bottom wall 21. A plurality of lamp beads (not shown in the figure) are distributed on the bottom wall 21, and the plurality of lamp beads may be evenly distributed on an outer side or inner side of the bottom wall 21. When the lamp beads are arranged on an inner wall of the bottom wall 21, that is, the plurality of lamp beads are evenly arranged between the first side wall 22 and the second side wall 23, and the bottom wall 21 is a transparent plate. In this way, light emitted from the lamp beads may be emitted through the bottom wall 21, and further an effect of protecting the lamp beads is improved on the premise of ensuring lighting of the lamp beads.

The first side wall 22 and the second side wall 23 may be made of rubber, plastic, and the like, such that the first side wall and the second side wall have certain strength and elasticity. A distance between the first side wall 22 and the second side wall 23 may be gradually increased from a position close to the bottom wall 21 to a position away from the bottom wall 21, such that a bell-mouth-like shape is formed. In this way, the first side wall 22 and the second side wall 23 tend to be away from each other, and further the first side wall 22 and the second side wall 23 are clamped in the fixing recess 11 in an interference manner, which facilitates subsequent disassembly and assembly of the lamp belt 20 so as to maintain the lamp beads.

Further, a preset position of a top of the second side wall 23 extends in a direction away from the first side wall 22 so as to form a plurality of clamping blocks 231. The clamping blocks 231 may be of a common hook structure. A bottom of a side wall of the fixing recess 11 is provided with a plurality of clamping recesses 111 corresponding to the clamping blocks 231 one by one, and the clamping blocks 231 are configured to match the clamping recesses 111 so as to clamp the second side wall 23 in the fixing recess 11. In this way, connection strength between the second side wall 23 and the fixing recess 11 is improved, and further the lamp belt 20 cannot easily fall off from the fixing recess 11.

Further, one end of the first side wall 22 away from the bottom wall 21 extends inward to form a limiting flange 221, and the supporting plate 32 presses the limiting flange 221 on a bottom of the fixing recess 11, such that connection strength between the first side wall 22 and the fixing recess 11 is improved. In combination with the above embodiment, the lamp strip 20 can further prevented from falling off from the fixing recess 11 easily. In this way, connection strength between the lamp belt 20 and the fixing recess 11 is ensured on the premise that the lamp belt 20 does not need to be locked by screws, and the lamp belt 20 can be assembled simply and conveniently, and has low material cost.

Figure 3:
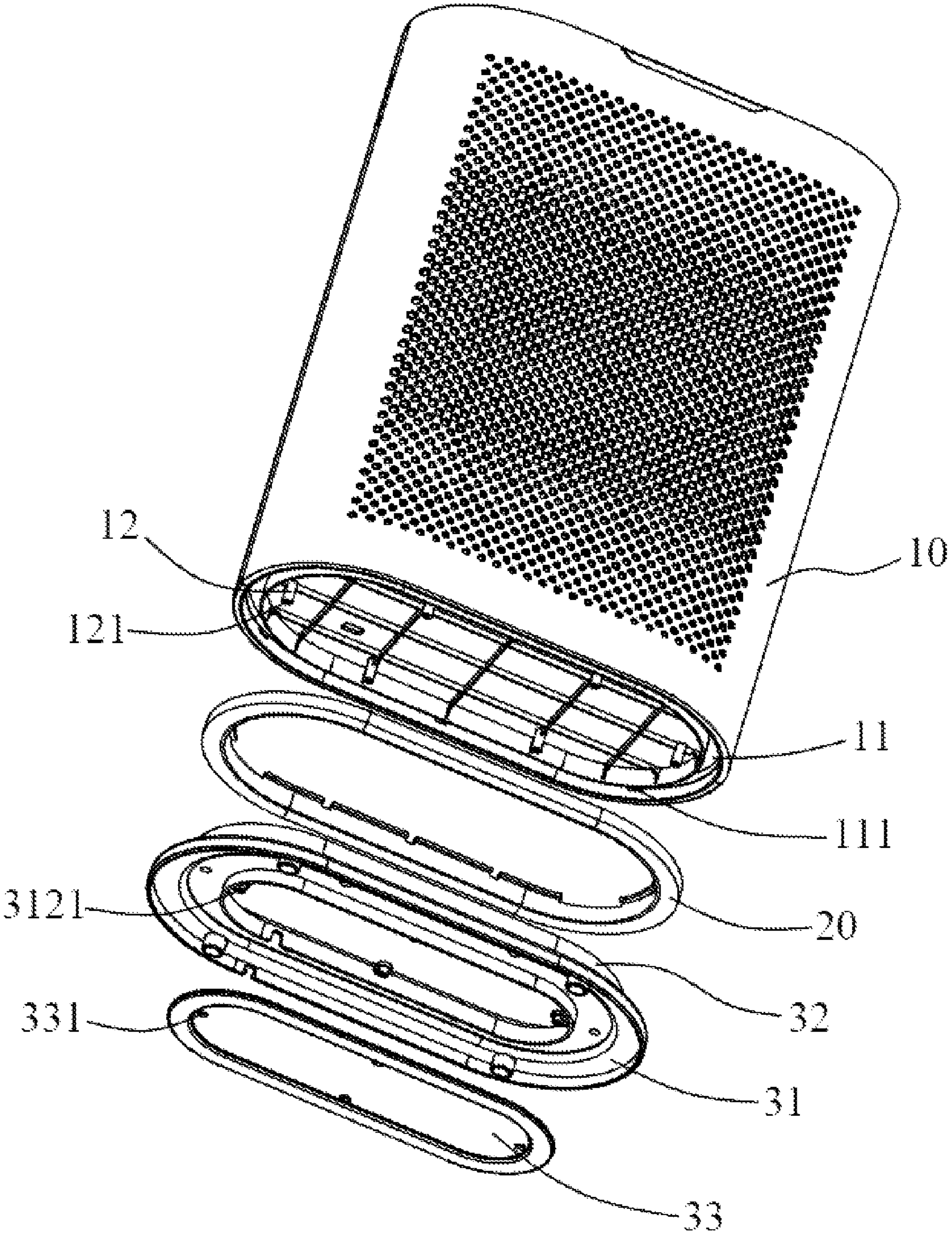
FIG. 3 is an exploded view of a solid diagram of the air purifier with an ambient lamp as shown in FIG. 1.
Figure 4:
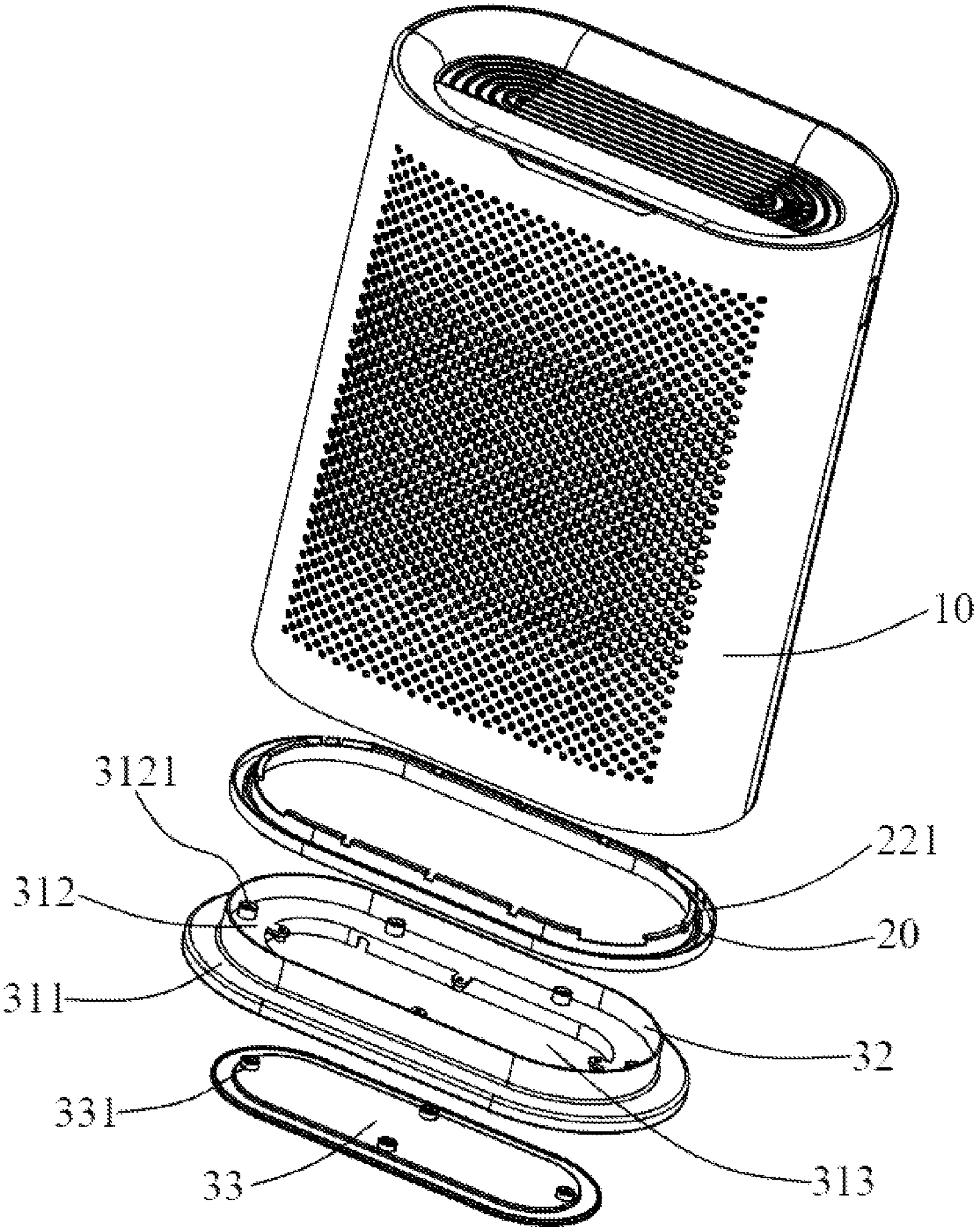
FIG. 4 is an exploded view of a solid diagram of another visual angle of the air purifier with an ambient lamp as shown in FIG. 1.
Figure 5:
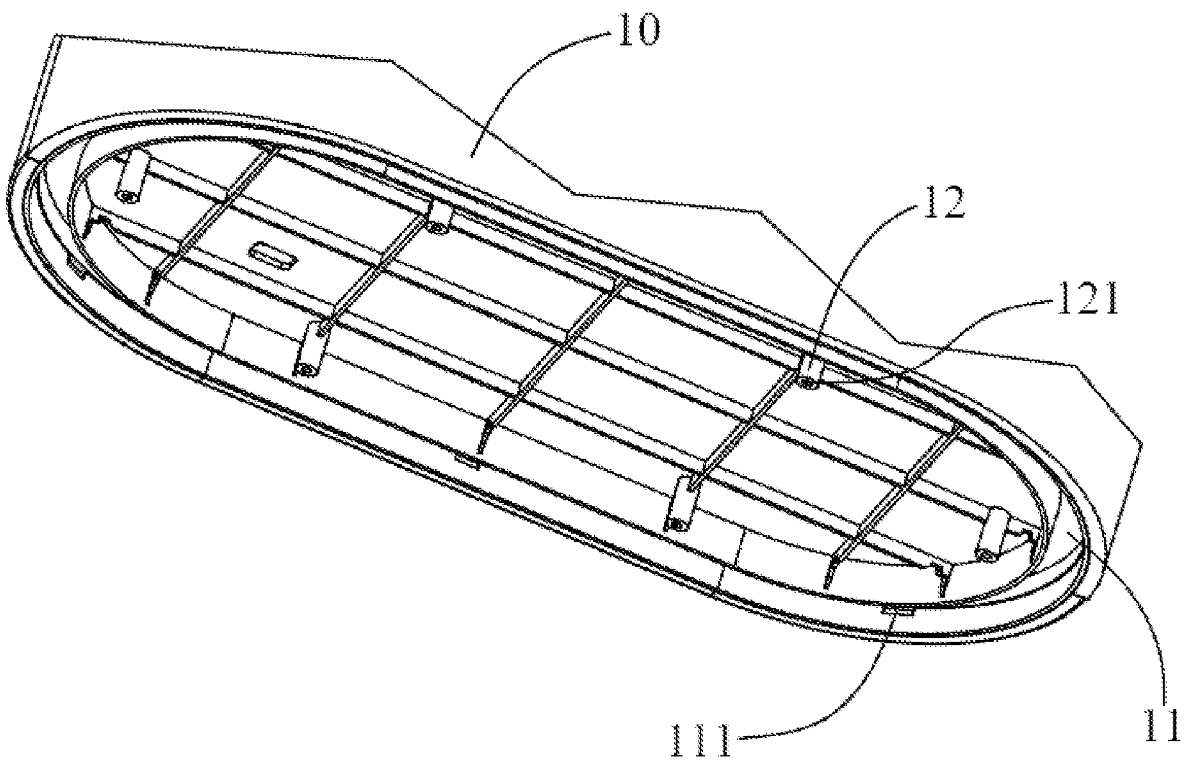
FIG. 5 is an enlarged schematic diagram of a bottom of an upper housing of the air purifier with an ambient lamp as shown in FIG. 1.

As shown in FIGS. 3-4, the lower housing 30 further includes a cover plate 33. The cover plate 33 is fixed to one side of the base 31 away from the upper housing 10, and the cover plate has a greater area than the through hole 313. The cover plate 33 is fixedly connected to the second annular belt 312, so as to close the through hole 313. The bottom of the upper housing 10 is provided with a plurality of fixing columns 12, and the fixing columns 12 are provided with threaded grooves 121. The second annular belt 312 is provided with a plurality of first threaded holes 3121 corresponding to the fixing columns 12 one by one in a penetrating manner. The cover plate 33 is provided with a plurality of second threaded holes 331 corresponding to the first threaded holes 3121 one by one in a penetrating manner. That is, both the second annular belt 312 and the cover plate 33 may be provided with a fixing column structure, and corresponding threaded holes are provided in the fixing column structure, and threaded hole and groove structures of the second annular belt, the cover plate and the fixing column structure are all located on the same straight line. The second threaded hole 331 is connected to the corresponding first threaded hole 3121 and the corresponding threaded groove 121 by means of the same bolt (not shown in the figure), such that the cover plate 33 is fastened to the second annular belt 312, and the lower housing 30 is fixed to the bottom of the upper housing 10. That is, a tip of the bolt passes the second threaded hole 331 and the first threaded hole 3121 in sequence and then is connected to the threaded groove 121, such that the cover plate 33 and the second annular belt 312 are connected to the upper housing 10, and further connection strength between the lower housing 30 and the upper housing 10 is ensured. In this case, the cover plate 33 further functions like a gasket.

In an example, the upper housing 10 is internally provided with a detection sensor (not shown in the figure) and a control module (not shown in the figure). The lamp belt 20 is a multi-colored lamp, which is capable of emitting light having different colors and/or different brightness. It should be noted that the above function may be achieved by setting the lamp beads capable of emitting light having different colors and controlling the plurality of lamp beads to emit light simultaneously. The detection sensor is configured to detect air quality, and the control module is configured to control the lamp belt 20 to emit light having different colors and/or different brightness according to the air quality detected by the detection sensor. In this way, a user can intuitively determine current indoor air quality according to a light emitting effect of the lamp belt 20. It should be noted that reference may be made to the prior art for specific structures and implementation principles of the detection sensor and the control module, which will not be repeated herein.

In conclusion, in the air purifier 100 with an ambient lamp according to the present invention, the bottom of the upper housing 10 is provided with a fixing recess 11, and further the supporting plate 32 of the lower housing 30 presses the lamp belt 20 in the fixing recess 11, such that the lamp belt 20 is fixed to the bottom of the upper housing 10, and the lamp belt and the base 31 of the lower housing 30 are arranged at an interval; and the lamp belt 20 is shielded to a certain extent, such that the lamp belt 20 may emit light softly via a gap between the lamp belt 20 and the base 31, and influence on a visual effect due to glare of the light source can be avoided. Meanwhile, the lamp belt 20 is arranged below the upper housing 10 and protected to a certain extent by the base 31, such that water cannot easily enter the lamp belt 20, a probability that the lamp belt is hit is greatly reduced, and the service life of the ambient lamp is prolonged.

The present invention is not only limited to the descriptions in the description and the embodiments, so other advantages and modifications can be easily achieved by those familiar with the art. Therefore, without departing from the spirit and scope of the general concept defined by the claims and the equivalent scope, the present invention is not limited to specific details, representative devices and illustrated instances shown and described herein.

The invention claimed is:

1. An air purifier with an ambient lamp, comprising an upper housing, a lamp belt, and a lower housing, wherein a bottom edge of the upper housing is provided with a fixing recess matching the lamp belt in shape, the lower housing comprises a base and a supporting plate vertically arranged at a preset position of the base, and the base is fixedly connected to a bottom of the upper housing, such that one end of the supporting plate away from the base presses the lamp belt in the fixing recess, and the lamp belt is arranged opposite an edge of the base at an interval;

wherein the lamp belt is an annular lamp belt, the fixing recess is an annular recess, and the supporting plate is an annular plate; the supporting plate divides the base into a first annular belt located at an outer side and a second annular belt located at an inner side; a middle portion of the second annular belt is provided with a through hole; and a vertical projection of the lamp belt relative to the base completely falls into the first annular belt.

2. The air purifier with an ambient lamp according to claim 1, wherein the lamp belt comprises an annular bottom wall, a first side wall vertically extending from an inner edge of the bottom wall, and a second side wall vertically extending from an outer edge of the bottom wall; and a plurality of lamp beads are distributed on the bottom wall, and the first side wall and the second side wall are clamped in the fixing recess in an interference manner.

3. The air purifier with an ambient lamp according to claim 2, wherein one end of the first side wall away from the bottom wall extends inward to form a limiting flange, and the supporting plate presses the limiting flange on a bottom of the fixing recess.

4. The air purifier with an ambient lamp according to claim 2, wherein the bottom wall is a transparent plate, and the plurality of lamp beads are evenly arranged between the first side wall and the second side wall.

5. The air purifier with an ambient lamp according to claim 2, wherein a reflective layer is further attached to one side of the first annular belt close to the upper housing.

6. The air purifier with an ambient lamp according to claim 2, wherein a preset position of a top of the second side wall extends in a direction away from the first side wall so as to form a plurality of clamping blocks, a bottom of a side wall of the fixing recess is provided with a plurality of clamping recesses corresponding to the clamping blocks one by one, and the clamping blocks are configured to match the clamping recesses so as to clamp the second side wall in the fixing recess.

7. The air purifier with an ambient lamp according to claim 1, wherein the lower housing further comprises a cover plate, the cover plate is fixed to one side of the base away from the upper housing, and the cover plate has a greater area than the through hole; and the cover plate is fixedly connected to the second annular belt, so as to close the through hole.

8. The air purifier with an ambient lamp according to claim 7, wherein the bottom of the upper housing is provided with a plurality of fixing columns, and the fixing columns are provided with threaded grooves; the second annular belt is provided with a plurality of first threaded holes corresponding to the fixing columns one by one in a penetrating manner; the cover plate is provided with a plurality of second threaded holes corresponding to the first threaded holes one by one in a penetrating manner; and the second threaded hole is connected to the corresponding first threaded hole and the corresponding threaded groove by means of the same bolt, such that the cover plate is fastened to the second annular belt, and the lower housing is fixed to the bottom of the upper housing.

9. The air purifier with an ambient lamp according to claim 1, wherein the upper housing is internally provided with a detection sensor and a control module, and the lamp belt is a multi-colored lamp; and the detection sensor is configured to detect air quality, and the control module is configured to control the lamp belt to emit light having different colors and/or different brightness according to the air quality detected by the detection sensor.

* * * * *